Oct. 26, 1954
L. A. MARIHART
2,692,705
SEEDER WITH AGITATOR AND ADJUSTABLE DISCHARGE CONTROLLER
Filed Oct. 9, 1950
3 Sheets-Sheet 1
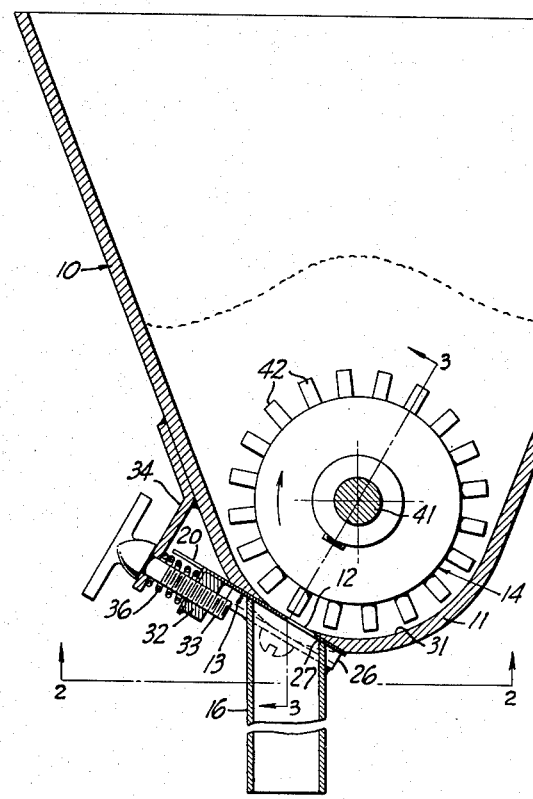
FIG.1_
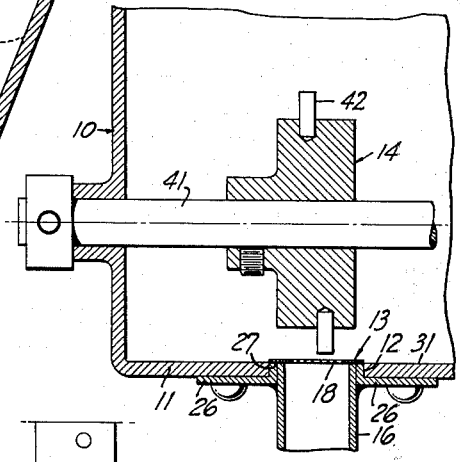
FIG.3_
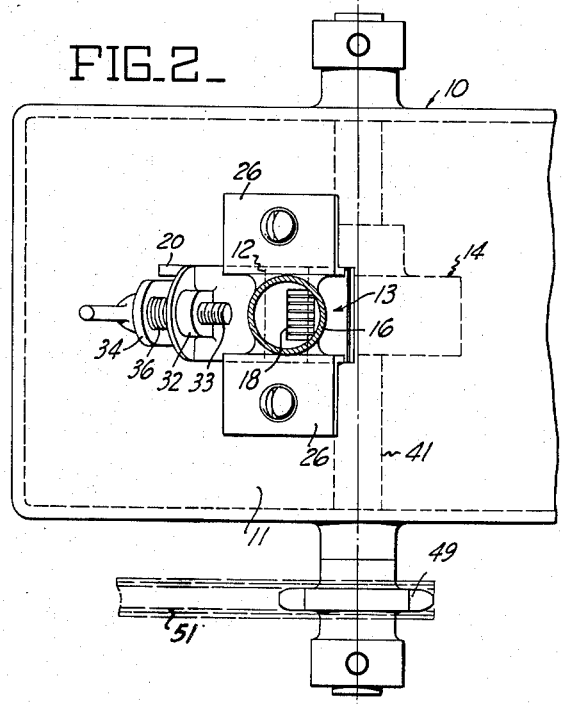
FIG.2_
FIG.4_
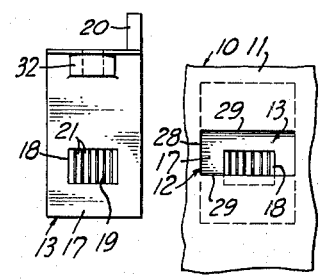
FIG.5  FIG.6
INVENTOR.
Leo A. Marihart
BY
ATTORNEYS

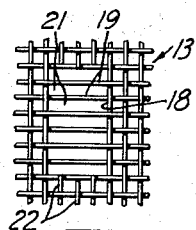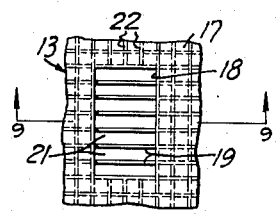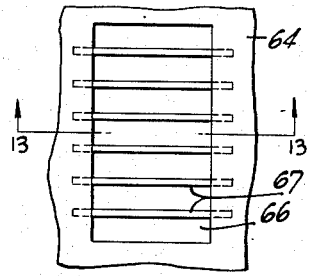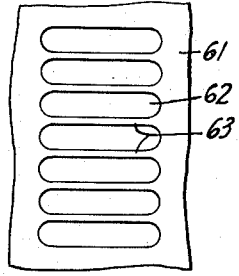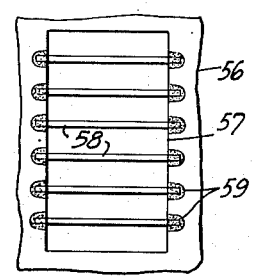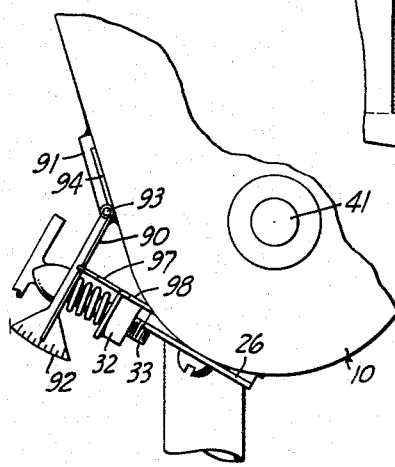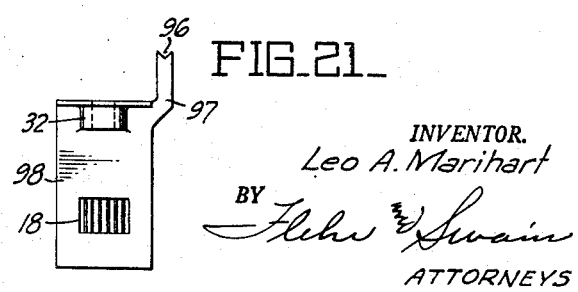

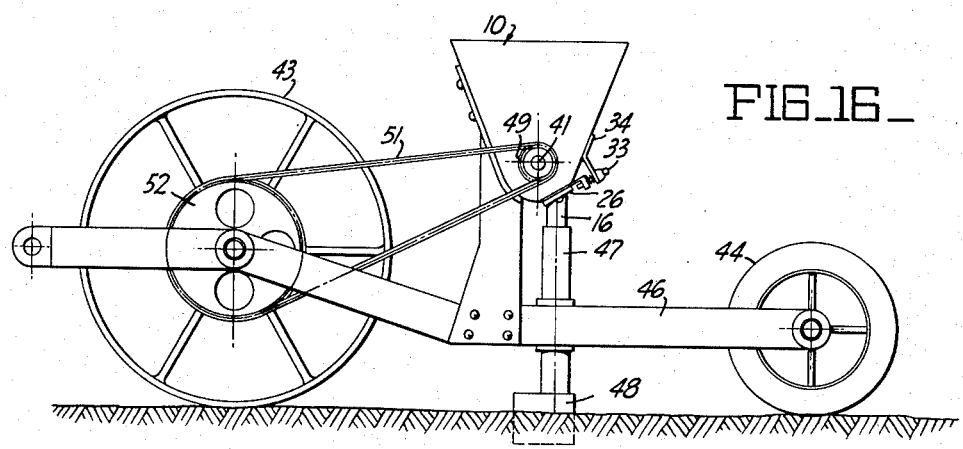
FIG_16_
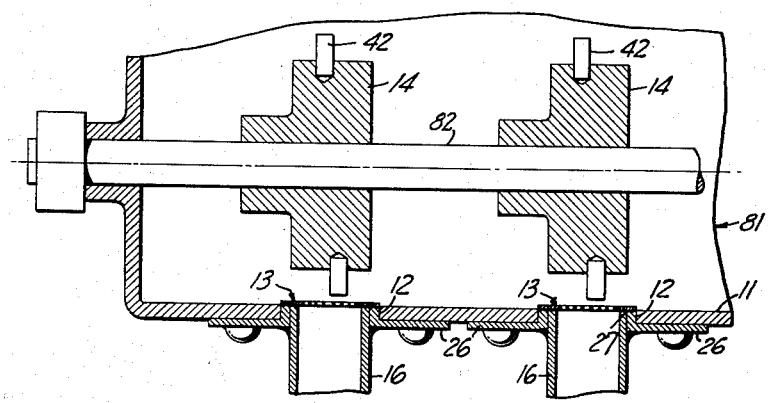
FIG_17_
FIG_19_
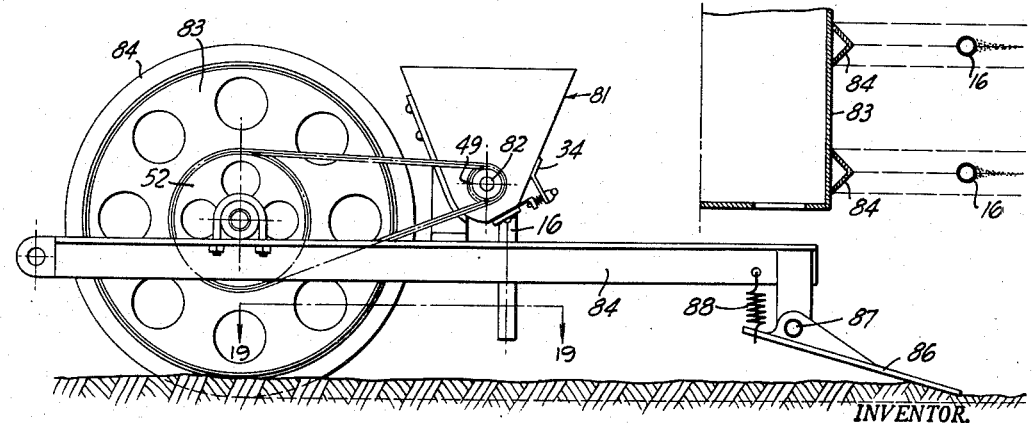
FIG_18_

Patented Oct. 26, 1954

2,692,705

UNITED STATES PATENT OFFICE 2,692,705

SEEDER WITH AGITATOR AND ADJUSTABLE DISCHARGE CONTROLLER

Leo A. Marihart, Monterey County, Calif.

Application October 9, 1950, Serial No. 189,125

4 Claims. (Cl. 222—313)

1

This invention relates generally to agricultural planting or seeding machines and particularly to feeding devices suitable for the same.

Conventional agricultural planters or seeders employ feeding means which is made adjustable and which serves to generally regulate the number of seeds deposited per linear foot of travel. With seeds of the larger sizes no particular difficulty is involved in the operation of such machines. However for the smaller sized seeds, such as lettuce, carrots, and the like, it is difficult if not impossible to secure close regulation of the feed to deposit the natural seed in the ground at optimum spaced intervals. As a result seeds like lettuce are deposited more or less indiscriminately whereby when the seed germinates, the plants of the row tend to be clumped together. In addition such practice is wasteful in that an optimum spacing may save a high percentage of the seeds used in conventional operations. It has been proposed to pelletize or otherwise process seed to facilitate seeding operations, but such practice is objectionable particularly in that it increases seeding costs, and the time period and efficiency of germination may be detrimentally affected.

It is an object of the present invention to provide an agricultural planter or seeder having novel feed means making possible relatively accurate seeding operations with optimum spacing of the seeds.

Another object of the invention is to provide seed feeding means of the above character which is capable of operating upon natural (i. e. unprocessed) small sized seeds such as lettuce, carrot and the like.

Another object of the invention is to provide seed feeding means of the above character which is adjustable over a relatively wide range.

Additional objects and features of the invention will appear from the following description in which the preferred embodiment has been set forth in detail in conjunction with the accompanying drawing.

Referring to the drawing:

Figure 1 is a side elevational view in section illustrating feed means incorporating the present invention.

Figure 2 is a cross-sectional view taken along the line 2—2 of Figure 1.

Figure 3 is a cross-sectional view taken along the line 3—3 of Figure 1.

Figure 4 is a view illustrating the periphery of the agitating wheel in linear development.

Figure 5 is a detail view illustrating the metering member employed with the feeding means.

2

Figure 6 is a detail showing the metering member of Figure 5 in an adjusted operative position.

Figure 7 is an enlarged fragmentary view illustrating one method for manufacturing a metering member.

Figure 8 is a view like Figure 7 but showing another stage in the manufacture.

Figure 9 is a cross-sectional view taken along the line 9—9 of Figure 8.

Figure 10 is an enlarged fragmentary view illustrating another type of metering device.

Figure 11 is a view like Figure 10 but showing another type of metering device.

Figure 12 is a view like Figure 10 but showing another type of metering device.

Figure 13 is a cross-sectional view taken along the line 13—13 of Figure 12.

Figure 14 is a diagrammatic view illustrating a metering member like that shown in Figure 5, but cooperating with an opening in the lower part of the feed hopper which has a special contour.

Figure 15 is a view like Figure 14 but showing another type of metering member.

Figure 16 is a side elevational view illustrating a planter incorporating the feed means illustrated in Figures 1 to 6 inclusive.

Figure 17 is a cross-sectional detail similar to Figure 3, but illustrating a modification in which a plurality of feed arrangements are employed in conjunction with a single hopper.

Figure 18 is a view like Figure 16 showing another embodiment of the machine.

Figure 19 is a detail taken on the line 19—19 of Figure 18.

Figure 20 is a detail showing a modification in which indicating means is provided for the metering member.

Figure 21 is a view like Figure 4 showing the metering member used in the modification of Figure 20.

The feed means illustrated in Figures 1 to 6 inclusive includes a suitable hopper 10, which is adapted to contain a substantial quantity of the seeds. The lower wall 11 of the hopper can be rounded substantially as illustrated in Figure 1, and is provided with an opening 12 through which the seeds are adapted to pass. The discharge of seeds through the opening 12 is controlled by a special metering member 13. Within the hopper there is a rotary agitating device 14 which has a zone of operation in proximity with the upper side of the metering member 13. A pipe or tube 16 extends downwardly from the opening 12 and serves to convey the seeds into the drill tube or like part of a planter.

One form of metering member 13 is illustrated in Figure 5. It consists of a flat impervious portion 17, a cutout portion 18, and a plurality of wires or rods 19 which are parallel and which span across the cutout portion 18. The wires 19 define elongated metering openings 21 between the same, and through which the seeds are adapted to pass when properly oriented. A tab or pin 20 is carried by one end of member 13 and serves as visual means to indicate the position of the member.

One method of forming a suitable metering member is illustrated in Figures 7 to 9 inclusive. Thus cross wires 22 of a piece of wire gauze or screen are cut and removed to form the cut away portion 18, while the other wires 19 are left intact. The meshes of the screen surrounding the cut away portion 18 are then filled with solder to form the portion 17. The wires 19 will have humps substantially as shown in Figure 9, which are not objectionable, and which in fact appear to be desirable under certain conditions.

In the mounting of the metering member 13, it is desirable to provide an adjustment whereby the effective length of the openings 21 can be adjusted to the feed rate. Thus the upper end of tube 16 is shown carried by a pair of mounting flanges 26, which in turn are removably attached to the adjacent lower wall 11 of the hopper. The upper end of the tube 16 is terminated on a plane which is inclined to the horizontal, and which forms a flat face 27 against which the metering member 13 is seated. The opening 12 in this instance is rectangularly contoured (Figure 6), with parallel edges 28 spaced apart a distance substantially greater than the width of the cutaway 18, and with parallel edges 29 which are spaced apart a distance substantially equal to or greater than the length of the wires 19. The edges 29 are preferably knife-like or feathered, so that there is no ledge of shoulder between the inner surface of the metering member and the inner curved contour line 31 of the hopper (Figure 1). With the contour line 31 conforming to the arc of a circle adjacent the opening 12, the inner face of the metering member coincides with a chord to the arc.

A nut 32 is mounted upon one end of the metering member 13, and is engaged by the threaded screw 33. This screw is carried by the bracket 34, and can be turned manually to adjust the metering member to a desired position. A compression spring 36 normally urges the metering member toward the right as viewed in Figure 1. Figure 6 illustrates one adjusted position for the metering member. Note that the impervious portion 17 blocks off a part of the opening 12, and that only a part of the length of the wires 19 are exposed, whereby seeds must pass through the spaces 21 between the exposed portions of these wires.

The agitating device 14 is in this instance in the form of a wheel mounted upon the horizontal shaft 41. The periphery of the wheel carries a plurality of staggered pins or studs 42, which can be distributed substantially as illustrated in Figure 4. It will be noted that the pins 42 pass in relatively close proximity with the metering member, the spacing depending upon the size of seed being handled.

Figure 16 illustrates how the feed means just described can be used in conjunction with a conventional type of planter. The planter in this instance consists of ground engaging wheels 43 and 44, which are journaled to the frame 46. The frame carries a drill tube 47, the lower end of which may connect with a shoe 48. The hopper 10 is carried by the frame 46 in such a manner that the tube 16 deposits seeds into the drill tube 47. A sprocket 49 is mounted upon one exterior end of the shaft 41, and is engaged by the chain 51, which also engages and is driven by a sprocket 52, mounted upon the wheel 43. The drive ratio should be selected according to various factors, such as the seeds to be handled, the range of feed rate desired, etc. In actual practice and using a ground engaging wheel 43 about fifteen inches in diameter, the drive ratio was 7 to 1. The machine in that instance handled lettuce seed and had a ground speed of about two to three miles per hour.

Operation of the planter and feed means described above is as follows: Assuming that lettuce seed is to be planted, the seeds are introduced into the hopper 10 in ample amount to submerge the agitator wheel 14. As is well known lettuce seed is relatively elongated and irregular as to width and thickness. The screw 33 is adjusted to a predetermined position depending upon the number of seeds which one desires to deposit per linear foot. When the planter is standing still, and the agitator wheel 14 is stationary, the seeds will not flow through the metering member, because of self-blocking action. When the machine moves forwardly the agitator wheel 14 is rotated to continuously agitate the seeds in the lower part of the hopper, and to cause the seeds in the space between the agitator wheel and the lower hopper wall 11 to progress in the direction of rotation of the wheel. The pins 42 continuously move through and agitate the mass of seeds, whereby the seeds are in a continuous state of agitation in conjunction with the general progression movement. The action just described causes the individual seeds to continuously vary with respect to their orientation, whereby variously oriented seeds are continuously presented to the upper face of the metering member 13. With such action a substantial percentage of the seeds tend to be generally aligned in the plane of the wheel because of the combing-through action of the pins. The openings 21 which are exposed to the seeds between the wires 19, are dimensioned whereby in width they reach substantially less than the length of the seeds. However a seed which is presented to a space 21 and which is properly oriented, can pass through the same. Thus the member 13 has a selective feed action which in turn serves to control the rate with which seeds are permitted to pass through the opening 12. Within reasonable limits this rate of feed is proportionate to the rate of rotation of the agitator wheel 14, and therefore a change in the speed of movement of the planter is compensated for by a corresponding change in the feed rate. In general the rate of feed selected will depend upon various factors including the character of the crop being planted, and the efficiency of germination.

Previous reference has been made to the necessity of orienting seeds for passage between the wires 19. The effective length of the spaces 21 between wires, exposed for passage of seeds, may be less than the average length of the seeds, but nevertheless seeds may pass through the openings with proper orientation. For greater feed rates the exposed length of spaces 21 may be somewhat greater than the average seed length.

By way of example, with feed means designed particularly for the handling of lettuce seed, the wires 19 of the metering device were 0.017 inch in diameter and spaced about 0.0386 inch apart. Seven openings 21 were provided and the effective length of the openings for a typical adjustment was 0.063 inch. The diameter of the agitating wheel 14 to the tip of the pins 42, was about 1⅞ inches, and the pins were about ⅛ inch long, and 3/32 inch in diameter. The wheel was disposed whereby the ends of the pins were spaced about 1/16 inch from the hopper wall portion 11. Nineteen pins were provided each about ½ inch apart and 3/32 inch in diameter. The total width of the wheel was about ⅝ inch. The ratio of drive from wheel 43 was 7 to 1. In another instance where the apparatus was used to feed carrot seed, the dimensions were the same as given above, except that only 12 pins were employed on an agitator wheel ⅜ inch in width, with a drive ratio of 5 to 1. The pins 42 in the latter instance operated directly over five of the seven metering openings, with two side metering openings disposed along the two sides of the zone of operation of the pins.

The metering member can be formed otherwise than by cutting away a wire mesh. Thus as shown in Figure 10 a member 56 is formed of sheet metal and is cut away at 57, to form a metering opening. Parallel rods or wires 58 extend across the opening 57, and are attached at their ends by welding or soldering as indicated at 59.

The metering member shown in Figure 11 consists of a piece of sheet metal 61, provided with a plurality of parallel slots 62. The metal strips 63 remaining between the slots serve in place of the wires 19 of Figure 7.

The metering member illustrated in Figures 12 and 13 consists of a sheet metal member 64, which is cut away at 66, and which carries a plurality of parallel strips 67. These strips take the place of the wires 19, and are spaced apart in the same manner to form metering passages between the same.

As illustrated in Figure 14 the edges of the opening in the lower wall of the hopper can be contoured in various ways to facilitate a desired type of adjustment. Thus in this instance an opening 71 has the side edges 72, the edge 73, and a stepped edge 74. A metering member as in Figure 8 can be used with such an opening.

An effect similar to that obtained with the arrangement of Figure 14, can be obtained by the means shown in Figure 15. In this instance the opening 76 in the lower wall of the hopper is square or rectangular the same as in Figure 6. However the metering member is so constructed that the wires 77 are of various lengths, whereby when the metering member is adjusted there is a stepped effect the same as in Figure 14. It will be evident that various blocking-off patterns can be used, other than the pattern shown in Figure 15, to secure a wider variety of feeds.

While an agitating device in the form of a wheel having pins projecting from its periphery has been found desirable, it should be understood that other types of agitating devices can be employed, provided the seeds are progressed past the metering member in a direction generally parallel to the length of the metering openings, and with continuous orientation of the individual seeds. In addition it is desirable that the agitating device generally align the seeds in the manner previously described.

My invention can be readily modified to adapt the same to various types and sizes of seed. Thus with the larger seeds it is desirable to increase the spacing between the wires 19, whereby such seeds can pass between the wires when properly oriented. Also in such event it is desirable to increase the distance between the ends of the pins 42 and the metering member, as by modifying the proportions or adjusting the shaft of the agitator wheel.

As illustrated in Figure 17 two or more agitating wheels can be carried upon a common shaft, and arranged to operate in conjunction with metering members as previously described. Thus the hopper 81 illustrated in Figure 17 is dimensioned to receive a plurality of agitating wheels 14, and these wheels operate above the metering members 13. Separate tubes 16 extend downwardly from each metering member. The agitating wheels 14 are mounted upon a common shaft 82, which can be driven in the manner previously described.

Figures 18 and 19 illustrate another and novel type of planter making use of my feed means. In this instance a drum-like ground engaging wheel 83 is carried by the frame 84, and the periphery of the wheel is provided with ridges or ribs 84 which press into the ground to form parallel troughs. The hopper 81 is mounted upon the frame 84, and is provided with a plurality of feed means as previously described, whereby seeds are fed at a controlled rate through the depending tubes 16. These tubes are arranged to drop seed into the troughs formed by the ribs 84, substantially as illustrated in Figure 19. At the rear end of the machine a plate 86 is pivoted at 87 to the frame 84, and the trailing edge of this plate is urged against the soil by the tension spring 88. The action of this plate against the loose and friable soil serves to substantially fill the troughs in which the seeds have been deposited, thus covering over the seed for effective germination.

In many instances it is desirable to provide more positive means to visually indicate the adjusted position of the metering member. The arrangement of Figure 20 is for this purpose and includes a bracket 91, corresponding to the bracket 34 of Figure 1, but which includes a graduated segment 92. A pointer 90 cooperates with this segment and is arranged to swing when the metering member is moved. Thus the pointer can be a projecting end portion of a wire spring, which is coiled about the peg 93 and which has a projecting portion 94 which presses against the hopper. At a point near the peg 93 the pointer engages in a notch 96 formed in the projection 97 of the metering device 98. The remainder of the metering device can be the same as shown in Figure 4. With the arrangement just described the end of the pointer moves when the metering member is adjusted, with magnified action, thus providing accurate means to gauge making adjustments.

I claim:

1. In an agricultural seeder, feed means comprising a hopper adapted to contain a quantity of seeds, a lower wall of the hopper having an opening therethrough for passage of seeds, seed metering means extending over the inner end of the opening to control discharge of seeds from the hopper into the opening, said metering means including a member provided with a plurality of metering openings, means adjustably mounting said member for affecting adjustment of the size of said metering openings, the width of each of said openings being less than the length of seeds whereby seeds must be selectively oriented to pass through the same, and rotary means within the hopper for continuously progressing seeds past said metering openings with continual agitation and varying orientation of seeds, said rotary means including elements disposed to sweep in proximity with said opening for the full length thereof, the axis of rotation of said rotary means being substantially perpendicular to the length of said openings.

2. In an agricultural seeder, feeding means comprising a hopper adapted to contain a quantity of seeds, a lower wall of the hopper being provided with an opening for discharge of seeds therethrough, metering means disposed to extend over the inner end of the opening, said metering means comprising a substantially planar member provided with a plurality of elongated metering openings, the width of each of said openings being less than the length of the seeds whereby seeds must be selectively oriented to pass through the same, adjustable means for adjusting the effective length of said openings, and a rotary agitating device disposed in the lower portion of said hopper and adapted to be submerged in a charge of seeds, said agitating device having a zone of operation in proximity with the inner side of said member and serving to progress seeds past said member with continual agitation and varying orientation of the same, said device including elements disposed to sweep in proximity to said openings for the full length thereof, the axis of rotation of said agitating device being substantially perpendicular to the length of said openings.

3. Feeding means as in claim 2 in which the metering member comprises a member having an opening, and a plurality of spaced parallel wires extending across the opening.

4. Seeding means as in claim 2 in which said rotary agitating device comprises a wheel having a plurality of circumferentially spaced pins on its periphery to form said elements, said pins being staggered in the direction of the axis of the wheel.

References Cited in the file of this patent
UNITED STATES PATENTS

| Number | Name | Date |
|---|---|---|
| 50,545 | Thomas et al. | Oct. 17, 1865 |
| 171,461 | Wishart | Dec. 21, 1875 |
| 331,600 | Zeigler et al. | Dec. 1, 1885 |
| 478,303 | Allgood | July 5, 1892 |
| 523,344 | Hancick | July 24, 1894 |
| 589,546 | Crownover | Sept. 7, 1897 |
| 766,407 | Wolfe | Aug. 2, 1904 |
| 769,823 | Greenfield | Sept. 13, 1904 |
| 806,032 | Wertz et al. | Nov. 28, 1905 |
| 814,182 | Anderson et al. | Mar. 6, 1906 |
| 1,327,455 | Willis et al. | Jan. 6, 1920 |
| 1,492,036 | Kjolstad | Apr. 29, 1924 |
| 1,625,345 | Yancey | Apr. 19, 1927 |
| 1,700,738 | Kier | Feb. 5, 1929 |
| 2,200,773 | Finne | May 14, 1940 |
| 2,248,700 | Finnell | July 8, 1941 |
| 2,509,069 | Mrachek | May 23, 1950 |
| 2,516,471 | Letsch | July 25, 1950 |